United States Patent [19]

Hahn et al.

[11] Patent Number: 5,250,594
[45] Date of Patent: Oct. 5, 1993

[54] AQUEOUS POLYMER DISPERSION WITH POLYMER PARTICLES EXHIBITING POLYOL GROUPS

[75] Inventors: Karl Hahn; Bernhard Stützel, both of Marl, Fed. Rep. of Germany

[73] Assignee: Hüls Aktiengesellschaft, Marl, Fed. Rep. of Germany

[21] Appl. No.: 726,221

[22] Filed: Jul. 5, 1991

[30] Foreign Application Priority Data

Aug. 29, 1990 [DE] Fed. Rep. of Germany ....... 4027283

[51] Int. Cl.$^5$ ................................................ C08K 5/15
[52] U.S. Cl. ..................................... 524/114; 524/458; 524/317; 524/460
[58] Field of Search ................ 524/114, 458, 317, 460

[56] References Cited

FOREIGN PATENT DOCUMENTS

| 0054685 | 6/1982 | European Pat. Off. |
| 0215518 | 3/1987 | European Pat. Off. |
| 62-000949 | 1/1987 | Japan. |
| 1-032863 | 7/1989 | Japan. |

*Primary Examiner*—Joseph L. Schofer
*Assistant Examiner*—Jeffrey T. Smith
*Attorney, Agent, or Firm*—Oblon, Spivak, McClelland, Maier & Neustadt

[57] ABSTRACT

The invention is directed to the preparation of aqueous polymer dispersions with polymer particles having polyol groups. The interfacial hydrophilia can be set in a desired manner. The dispersions contain substantially no dissolved macromolecular substances in the aqueous phase and are very stable. The dispersions are obtained through emulsion polymerization and subsequent modification.

7 Claims, No Drawings

AQUEOUS POLYMER DISPERSION WITH POLYMER PARTICLES EXHIBITING POLYOL GROUPS

BACKGROUND OF THE INVENTION

1. Field of the Invention

The invention lies in the field of the preparation and application of aqueous polymer dispersions. The dispersions are prepared through emulsion polymerization of olefinic unsaturated monomers in the presence of radical initiators. They are further processed with the addition of suitable additives and auxiliary agents, for example, into emulsion paints, dispersion adhesives, spread coating compounds to coat paper, coating compounds to coat the back of carpets, and compounds to manufacture latex foam.

2. Description of the Prior Art

Polymer dispersions must be stable not only during preparation but also during further processing. In particular, they must be adequately stable with respect to shear forces, electrolytes and frost-thaw cycles. They must be compatible with additives, for example, with pigments and fillers. When coating substrates, they must be capable of interacting with them so that the polymer adheres well to the substrate.

With respect to these requirements, the kind and quantity of the auxiliary agents and the composition and structure of the polymer at the surface of the polymer particles are of importance. There are various methods for modifying the surface of polymer particles. One method consists of introducing hydroxyl groups. This method makes it possible to set the interfacial hydrophilia. The introduction of polyol groups has proven to be especially effective. This can be done by known methods, during or after emulsion polymerization.

In Ullmann's Encyklopädie der technischen Chemie, 4th edition, Vol. 19, page 370, right column, 1.3.4 emulsion polymerization, the preparation of poly(vinyl acetate)-dispersions through emulsion polymerization of vinyl acetate in the presence of a radical initiator and poly(vinyl alcohol) as protective colloid is described. During polymerization a part of the poly(vinyl acetate) is grafted onto the poly(vinyl alcohol). Thus, the product is not uniform. Evidently, it contains a graft product in addition to poly(vinyl alcohol) and/or poly(vinyl acetate). The latter cannot be separated or can only be separated with great expense from the graft product. Nonuniformity of polymer dispersions is a drawback for some applications.

In European Published Patent Application No. 0 054 685, the preparation of aqueous polymer dispersions with polymer particles exhibiting glycol groups is described. In a first process step an aqueous polymer dispersion is obtained through emulsion polymerization of a mixture comprising 85 wt. % of vinyl acetate and 15 wt. % of glycidyl methacrylate in the presence of a radical initiator. In a second process step the polymer dispersion is treated with a sodium hydroxide solution. In so doing, the epoxide groups originating from the first process step are hydrolyzed forming glycol groups (Example 3). The polymer dispersions obtained contain, in the aqueous phase, substantially no dissolved macromolecular substances. The glycol groups contribute negligibly to the stability of the dispersions.

SUMMARY OF THE INVENTION

It is an object of the invention to provide aqueous polymer dispersions with polymer particles having surface polyol groups that overcome the drawbacks of the prior art.

This object of the invention and other objects of the invention, as will become apparent hereinafter, have been achieved by the provision of an aqueous polymer dispersion of polymer particles having polyol groups, obtained by:

(A) preparing an aqueous polymer dispersion of a polymer comprising
  (i) 0.5 to 25 wt. %, based on the total monomers, of monomeric units from a monomer of the formula (I)

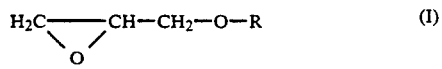

wherein R is $-CO-CR_1=CH_2$ or $-CH_2-CR_1=CH_2$ and $R_1$ is H or a $C_1-C_4$ alkyl group, and (ii) 75 to 99.5 wt. %, based on the total monomers, of at least one other olefinically unsaturated monomer, copolymerizable with said monomer of the formula (I), through emulsion polymerization of said monomers in the presence of a radical initiator; and (B) reacting the so-obtained aqueous polymer dispersion with a low molecular weight, polyhydroxylated, organic compound having a primary or secondary amino group or a carboxyl group.

DETAILED DESCRIPTION OF THE INVENTION

The subject matter of the invention is an aqueous polymer dispersion that has polymer particles having surface polyol groups, obtained in two process steps. In process step (A) an aqueous polymer dispersion of a polymer comprising 0.5 to 25, preferably 1 to 14, wt. % of a compound of the formula

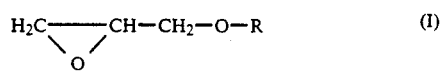

wherein R is $-\underset{\underset{O}{\|}}{C}-\underset{R_1}{\overset{|}{C}}=CH_2$ or $-H_2C-\underset{R_1}{\overset{|}{C}}=CH_2$, and $R_1$ is H or $C_1-C_4$-alkyl;

and 75 to 99.5, preferably 86 to 99, wt. % of at least one other olefinically unsaturated monomer, copolymerizable with the compound of formula (I), based on the total monomers, is obtained through emulsion polymerization in the presence of a radical initiator.

In process step (B), the obtained aqueous polymer dispersion is reacted with a low molecular weight, polyhydroxylated, organic compound having a primary or secondary amino group or a carboxyl group. In so doing, the epoxide groups originating from process step (A) react with the primary or secondary amino groups or the carboxyl groups of the polyhydroxylated compound. This compound exhibits at least three, preferably at least four hydroxyl groups. By low molecular weight compound is understood a compound exhibiting a molecular weight of <500 or a mixture of compounds exhibiting an average molecular weight ($\overline{M}w$) of <500.

Preferred compounds of the general formula (I) are glycidyl(meth)acrylate and allyl glycidyl ether.

The other olefinic unsaturated monomers are not subject to any particular limitation. Suitable monomers include vinyl esters of $C_2$ to $C_{12}$ alkanecarboxylic acids, such as vinyl acetate; vinyl chloride; 1,3-dienes, such as 1,3-butadiene and isoprene; vinyl aromatic compounds, such as styrene; ($C_1$ to $C_{18}$-alkyl)(meth)acrylates, such as n-butyl acrylate; di-($C_1$ to $C_{12}$-alkyl)-maleinates and -furmarates; and (meth)acrylonitrile.

The polymer may further include functional comonomers, in particular unsaturated mono- and di-carboxylic acids such as (meth)acrylic acid, maleic acid and fumaric acid; mono($C_1$ to $C_{12}$ alkyl)-maleinates and -furmarates; unsaturated carboxylic acid amides such as (meth)acrylamide; and unsaturated sulfonic acids. However, the quantity of these functional monomers is usually <10 wt. %, based on the total monomers.

The emulsion polymerization according to process step (A) can be effected by known techniques (see, for example, Houben-Weyl, Methoden der Organischen Chemie, 4th edition, Vol. 14/1 (1961), page 133 ff. and EP-PS 0 215 518).

The emulsion polymerization may be conducted in the presence of conventional radical initiators. Suitable radical initiators include, for example, peroxodisulfates, $H_2O_2$ and their combinations with suitable reducing agents.

The emulsion polymerization can be conducted in the absence or in the presence of conventional emulsifiers.

The emulsion polymerization is preferably conducted, in the presence of conventional emulsifiers, according to a semicontinuous feed process. The addition of the compound of the formula I is preferably started after a conversion of at least 80 wt. % of the other olefinic, unsaturated monomers, based on the weight of those monomers. In this phase of polymerization, it must be observed that as far as possible no new particles are formed.

The reaction, according to process step (B), is conducted preferably with a polyhydroxylated compound, which is derived from a pentitol, hexitol or a hexose.

Suitable polyhydroxylated compounds are: hexonic acids such as gluconic acid ; hexuronic acids such as glucuronic acid, hexosamines, i.e., 2-amino-2-desoxyhexoses, such as the amino sugar glucosamine ; 1-amino-1-desoxy-hexitols, such as glucamine and bisglucamine (molecular weight 345) of the formula

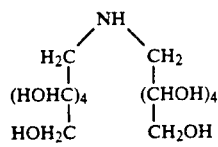

The reaction of the polyhydroxylated compounds is usually conducted at pH>7, preferably, in the presence of suitable catalysts. Suitable catalysts include, for example, tetra(normal-butyl) ammonium iodide and benzyl trimethyl ammonium iodide.

The polymer dispersions of the invention can be subjected to cleaning operations. Residual monomers can be removed by steam distillation. Water-soluble, low molecular weight components can be (largely) separated through treatment with ion exchangers, through dialysis or through membrane filtration (e.g., ultrafiltration).

The dispersions contain substantially no dissolved macromolecular substances in the aqueous phase. They exhibit high stability, especially with respect to shear forces, even in the absence of ionic groups.

In accord with the present invention, aqueous polymer dispersions with high surface tension can be prepared. They are especially suitable for manufacturing spread coating compounds, to coat paper, that show a very low tendency to foam during processing.

Ion-deficient polymer dispersions, according to the present invention, are suitable to manufacture coating compositions to protect metal surfaces from corrosion.

Polymer dispersions for special purposes can also be obtained that are suitable for example, to use as carrier material for medical diagnostic tests (see, for example, Colloid Poly. Sci., Vol. 267 (1989), page 861 ff).

The invention is explained with the following examples. "Parts" denote parts by weight and "percent" denotes percent by weight. The comparison examples that are not in accord with the invention are denoted with capital letters.

EXAMPLES 1 and 1a

Process Step (A)

50 parts of an aqueous solution, which contains 0.002 parts of the sodium salt of ethylenediamine tetraacetic acid and 0.038 parts of a commercially available sodium paraffin sulfonate, of approx. 15 carbon atoms, were introduced into a polymerization reactor. The following feeds 1 to 4 were added in the manner specified below under nitrogen as protective gas at 50° C.

| Feed 1: | 23.75 parts of styrene |
|---|---|
| Feed 2: | 12.5 parts of water |
| | 0.22 parts of the aforementioned paraffin sulfonate |
| | 0.1 parts of $Na_2S_2O_5$ |
| | 0.07 parts of NaOH (100%) |
| Feed 3: | 12.5 parts of water |
| | 0.2 parts of $Na_2S_2O_8$ |
| Feed 4: | 1.25 parts of glycidyl methacrylate |

10% of feed 1 was added. Then, feeds 2 and 3 were started (time 0). At time 15 minutes, feed 2 was interrupted until time 30 minutes. At this time, feed 1 was started and feed 2 was resumed, again. At time 4 hours 30 minutes, feed 1 was terminated and feed 4 was started. At time 5 hours, feeds 2 and 4 were terminated. At time 6 hours, feed 3 was ended. At time 7 hours 30 minutes, the reactor content was cooled and upon reaching room temperature filtered. In so doing, a very small quantity of deposits were separated off. The solids content amounted to 24.4%. The pH value was 7.7.

Process Step (B)

The dispersion obtained above was treated with D-glucamine, in a quantity equimolar with the quantity of glycidyl methacrylate, added to prepare the dispersion, i.e., a solution of 15.7 parts of D-glucamine in 84.3 parts of water was added to 1,000 parts of the dispersion obtained above. The reaction mixture was heated to 70° C. and treated with 0.13 parts of tetra(normal-butyl) ammonium iodide (1%, based on the quantity of glycidyl methacrylate on which this reaction batch is based). After 3 hours, the reaction was terminated.

A portion of the dispersion obtained was treated at room temperature with a 1 : 1 mixture of an anion exchanger and a cation exchanger. A pH value of 10.1 was obtained by addition of a sodium hydroxide solution. The so-cleaned dispersion exhibited a distinctly higher viscosity than the uncleaned dispersion.

The uncleaned dispersion and the cleaned dispersion (1 and 1a, respectively) were characterized as shown in the following Table.

EXAMPLES A and Aa

A dispersion, obtained according to Example 1, process step A, was treated at room temperature with the same volume of a 0.1 N sodium hydroxide solution (Process step B'). After 24 hours a portion of the dispersion obtained (A) was cleaned as stated in Example 1.

The uncleaned dispersion and the cleaned dispersion (A and Aa, respectively) were characterized as shown in the following Table.

cleaned dispersion and the cleaned dispersion (2 nd 2 a, respectively) were characterized as shown in the Table.

EXAMPLE 3

Process Step (A)

Example 2 was modified in such a manner that feed 1 comprised 23.75 parts of styrene. Solids content: 24.2%; pH: 4.2.

Process Step (B)

Example 2 was modified in such a manner that the D-glucamine was replaced with an equimolar quantity of bisglucamine. The uncleaned dispersion obtained was characterized as shown in the Table.

What is claimed as new and desired to be secured by Letters Patent of the U.S. is:

1. An aqueous polymer dispersion of polymer particles having polyol groups, obtained by:
   (A) preparing an aqueous polymer dispersion of a

TABLE

| Example | Process step A monomers, parts* | Process step B or B' conversion with amino-polyol or treatment with NaOH | Treatment with ion exchangers | Solids content % | pH | Surface tension mN/m | Stability with respect to NaCl** | Shear stability *** min |
|---|---|---|---|---|---|---|---|---|
| 1 | S/GMA 95/5 | glucamine | — | 23.5 | 10.1 | 52.6 | + | ≧30 |
| 1a | like ex. 1 | glucamine | + | 20.6 | 10.0 | 71.0 | + | ≧30 |
| A | like ex. 1 | NaOH | — | 12 | >12 | 52.4 | + | 6 |
| Aa | like ex. 1 | NaOH | + | 10 | 9.0 | 63.0 | + | 12 |
| 2 | S/BA/GMA, 47.5/47.5/5 | glucamine | — | 22.8 | 9.4 | 41.1 | + | about 30 |
| 2a | like ex. 2 | glucamine | + | 18.6 | 10.4 | 68.8 | — | ≧30 |
| 3 | S/GMA, 95/5 | bisglucamine | — | 25.0 | 9.0 | 42.7 | + | ≧30 |

*S = styrene; GMA = glycidyl methacrylate; BA = n-butyl acrylate
**The dispersion was treated with a 10% NaCl solution at a volume ratio of 1:1.
***The dispersion was tested at 20,000 rpm with a dispersing device (Ultra-Turrax, Janke & Kunkel).

EXAMPLES 2 and 2a

Process Step (A)

60 parts of an aqueous solution, which contains 0.05 parts of the aforementioned paraffin sulfonate and 0.8 parts of $H_2O_2$ (30% in water) were introduced into a polymerization reactor. In addition, 0.00025 parts of $FeSO_4.7H_2O$ were added as a weakly acidic aqueous solution. The following feeds 1 to 4 were added in the manner specified below under nitrogen at 65° C.

| Feed 1: | 11.875 parts of styrene |
| | 11.875 parts of n-butyl acrylate |
| Feed 2: | 15 parts of water |
| | 0.25 parts of the aforementioned paraffin sulfonate |
| | 0.5 parts of ascorbic acid |
| Feed 3: | 5 parts of water |
| | 0.2 parts of NaOH (100%) |
| Feed 4: | 1.25 parts of glycidyl methacrylate |

At time 0, feeds 1 to 3 were started. At time 4 hours 30 minutes, feed 1 was ended and feed 4 was started. At time 5 hours, feed 4 was terminated. At time 6 hours, feeds 2 and 3 were ended and a solution of 0.1 parts of paraffin sulfonate in 2 parts of water were added. At time 8 hours, the reactor content was cooled. Solids content: 23.7%; pH: 6.0.

Process Step (B)

Process step B was carried out analogous to process step B of Example 1. A portion of the dispersion obtained was cleaned as specified in Example 1. The unpolymer comprising
   (i) 0.5 to 25 wt. %, based on the total monomers, of monomeric units from a monomer of the formula (I)

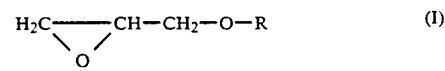

wherein R is $-CO-CR_1=CH_2$ or $-CH_2-CR_1=CH_2$ and $R_1$ is H or a $C_1$-$C_4$ alkyl group, and
   (ii) 75 to 99.5 wt. %, based on the total monomers, of at least one other olefinically unsaturated monomer, copolymerizable with said monomer in the presence of a radical initiator; and
(B) reacting the aqueous polymer dispersion prepared in part (A) with a low molecular weight, polyhydroxylated derivative of a pentitol, a hexitol, or a hexose having a primary or secondary amino group of a carboxyl group.

2. The aqueous polymer dispersion according to claim 1, wherein the compound of formula (I) is glycidyl (meth)acrylate or allyl glycidyl ether.

3. The aqueous polymer dispersion according to claim 1, wherein the other olefinically unsaturated monomer is selected from the group consisting of vinyl esters of $C_2$-$C_{12}$-alkanecarboxylic acids, vinyl chloride, 1,3-dienes, Vinyl aromatics, ($C_1$-$C_{18}$ alkyl)(meth)acrylates, di-($C_1$-$C_{12}$ alkyl)-maleinates and -fumarates, and (meth)acrylonitrile.

4. The aqueous polymer dispersion according to claim 3, wherein said polymer further comprises less than 10 wt. % of functional monomers selected from the group consisting of olefinically unsaturated mono- and di-carboxylic acids, mono($C_1$–$C_{12}$ alkyl)-maleinates and -fumarates, olefinically unsaturated carboxylic acid amides and olefinically unsaturated sulfonic acids.

5. The aqueous polymer dispersion according to claim 1, wherein said polymer comprises 1 to 14 wt. %, based on the total monomers, of monomeric units from a monomer of the formula (I) and 86 to 99 wt. %, based on the total monomers, of monomeric units of said at least one other olefinically unsaturated monomer.

6. The aqueous polymer dispersion according to claim 1, wherein said emulsion polymerization is carried out as a semicontinuous feed process wherein said monomer of the formula (I) is only added to the emulsion polymerization after a conversion of at least 80 wt. % of said at least one other olefinically unsaturated monomer, based on the total of said at least one other olefinically unsaturated monomer.

7. The aqueous polymer dispersion according to claim 1, wherein said low molecular weight, polyhydroxylated, organic compound is a hexonic acid, a hexuronic acid or a hexosamine.

* * * * *